(12) United States Patent
Kawaguchi et al.

(10) Patent No.: US 7,167,207 B2
(45) Date of Patent: Jan. 23, 2007

(54) CRADLE APPARATUS FOR CAMERA (75) Inventors: Tsukasa Kawaguchi, Asaka (JP); Shino Kanamori, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 680 days.

(21) Appl. No.: 10/153,796

(22) Filed: May 24, 2002

(65) Prior Publication Data
US 2002/0176020 A1 Nov. 28, 2002

(30) Foreign Application Priority Data
May 28, 2001 (JP) ............................. 2001-158835

(51) Int. Cl.
*H04N 5/225* (2006.01)
(52) U.S. Cl. .................... 348/375; 348/207.1; 348/376
(58) Field of Classification Search ................ 348/373, 348/207.1, 372, 375; 455/556.1, 556.2, 573; 396/425, 428, 301; 439/374–381, 144; 361/686; 248/316.4
See application file for complete search history.

(56) References Cited

U.S. PATENT DOCUMENTS

| | | | | |
|---|---|---|---|---|
| 5,281,988 A | * | 1/1994 | Martin | 396/59 |
| 5,341,171 A | * | 8/1994 | Mori et al. | 348/373 |
| 5,392,350 A | * | 2/1995 | Swanson | 379/446 |
| 5,455,625 A | * | 10/1995 | Englander | 348/375 |
| 5,461,546 A | * | 10/1995 | Kobayashi et al. | 361/796 |
| 5,535,093 A | * | 7/1996 | Noguchi et al. | 361/686 |
| 5,815,205 A | * | 9/1998 | Hashimoto et al. | 348/373 |
| 5,836,563 A | * | 11/1998 | Hsin-Yung | 248/316.4 |
| 6,010,343 A | * | 1/2000 | Konoya et al. | 439/144 |
| 6,081,422 A | * | 6/2000 | Ganthier et al. | 361/686 |
| 6,286,797 B1 | * | 9/2001 | Thaxton | 248/229.14 |
| 6,301,106 B1 | * | 10/2001 | Helot et al. | 361/686 |
| 6,587,152 B1 | * | 7/2003 | Sharp et al. | 348/373 |
| 2002/0107043 A1 | * | 8/2002 | Adamson et al. | 455/550 |

* cited by examiner

Primary Examiner—Ngoc-Yen Vu
Assistant Examiner—Gregory Madden
(74) Attorney, Agent, or Firm—Sughrue Mion, PLLC (57) ABSTRACT The cradle apparatus for a camera facilitates satisfactory engagement and disengagement of a camera connector, ready locking of a camera in a state in which connectors are connected, and minimization of the dustiness of the connector of the cradle is to be provided. The cradle apparatus is mainly configured of a cradle body, a box-shaped sliding member, which is slidable relatively to the cradle body and accommodates and fixes a digital camera, and a cradle connector disposed on a side of the cradle body. By sliding the sliding member in a direction orthogonal to the mounting direction of the camera after mounting the digital camera to the sliding member, a camera connector can be engaged with and disengaged from the cradle connector.

27 Claims, 10 Drawing Sheets

CRADLE APPARATUS FOR CAMERA

BACKGROUND OF THE INVENTION

1. Field of the Invention

The present invention relates to a cradle apparatus for a camera, and more particularly to a cradle apparatus for a camera suitable for two-way communication with an external device, such as a personal computer (PC).

2. Description of the Related Art

Recently, there has been proposed a cradle apparatus for a camera which enables, when a picture taken with a digital camera is to be inputted to a PC, the digital camera mounted with the cradle apparatus to automatically connect the digital camera and the PC via the cradle apparatus and thereby to facilitate two-way communication between the digital camera and the PC for ready inputting of the picture to the PC in Japanese Patent Application No. 2001-8067 corresponding to U.S. patent application Ser. No. 10/043,231 (which was, at the time the present invention was made, not published, not publically known, and assigned to the same assignee to which the present invention was subject to an obligation of assignment).

This cradle apparatus for a camera has a cradle connector on the bottom face of its camera mount and, when a camera is mounted onto the camera mount, the mounting action is synchronized to connect the cradle connector to a camera connector provided on the bottom face of the camera.

However, a cradle apparatus having a cradle connector on the bottom face of the camera mount as mentioned above may allow the camera to be inserted obliquely into the camera mount, and the resultant prying might damage the connector.

Moreover, when the camera is not mounted in the camera mount, the cradle connector provided on the bottom face of the camera mount, as its terminals are exposed upward, may become dusty, involving the risk of inviting faulty operation of the connector.

Moreover, when the camera mounted in the cradle apparatus is lifted by itself, the connector may be easily disengaged to adversely affect transfers of visual data and the like, and there also is the risk that the cradle apparatus may fall off.

SUMMARY OF THE INVENTION

The present invention, attempted in view of these problems, is intended to provide a cradle apparatus for a camera facilitating satisfactory connection between connectors, ready locking of the camera in a state in which the connectors are connected, and minimization of the dustiness of the cradle connector.

In order to achieve the objects stated above, the present invention is directed to a cradle apparatus which electrically connects a camera with an external device, the cradle apparatus comprising: a cradle body having a camera mount on which the camera is mounted; a sliding member which holds the camera, the sliding member being disposed in the camera mount of the cradle body slidably in a sliding direction substantially orthogonal to a mounting direction of the camera; and a cradle connector disposed in the cradle body to protrude in the sliding direction of the sliding member, the cradle connector being engaged with and disengaged from a camera connector provided on a face of the camera substantially orthogonal to the sliding direction of the sliding member when the sliding member holding the camera slides together with the camera within the cradle body.

According to the present invention, after having the camera held by the sliding member, this sliding member is slid in a direction substantially orthogonal to the mounting direction of the camera, and the camera connector is thereby engaged with and disengaged from the cradle connector. As the camera slides together with the sliding member guided to be slidable relatively to the cradle body, the camera connector can be engaged with and disengaged from the cradle connector with no trouble. In addition, as the camera connector slides in a direction substantially orthogonal to the engaging/disengaging direction of the camera and connected to the cradle connector, the camera is locked against sliding in the engaging/disengaging direction of the camera in this state of connection. Thus, even if the camera is lifted by itself, the connectors will not be disconnected. Furthermore, as the cradle connector is laterally disposed relatively to the cradle body and accordingly its terminals are not exposed upward, the dustiness of the terminals can be kept to the minimum.

For example, the sliding member can comprise a substantially box-shaped slider which holds the camera on its front, back, right and left faces. Alternatively, in another embodiment, the sliding member comprises a pair of holders having holding faces that are substantially orthogonal to the sliding direction of the sliding member, the pair of holders holding the camera on its right and left faces; and the camera mount holds front and back faces of the camera. In still another embodiment, the sliding member comprises a pair of holders having holding faces that are substantially orthogonal to the sliding direction of the sliding member, the pair of holders holding the camera on its front and back faces; and the camera mount holds right and left faces of the camera.

Preferably, the sliding member comprises an elastic member which is elastically deformed when the camera is mounted to hold the camera on its right and left faces or front and back faces.

Preferably, the sliding member comprises a non-slip friction member disposed inside thereof.

Preferably, the cradle apparatus further comprises a connector cover disposed on the cradle body movably back and forth between a position where the connector cover covers the cradle connector and a position where the connector cover exposes the cradle connector, the connector cover moving back and forth in synchronization with the sliding of the sliding member. Alternatively, the sliding member can comprise a connector cover which covers the cradle connector when the sliding member has slid to a position enabling the camera to be engaged and disengaged, the connector cover being unitedly formed on the sliding member.

According to the present invention, the cradle connector can be protected from dust.

Preferably, the cradle apparatus further comprises a charging unit which charges a battery in the camera via the cradle connector. According to the present invention, when a battery is accommodated in the battery housing, this accommodated battery serves as a stopper to forbid inadvertent further sliding of the sliding member.

Preferably, the cradle apparatus further comprises a battery housing which, when the sliding member is slid so as to connect the camera connector to the cradle connector, is demarcated by the sliding member and the camera mount of the cradle body. According to the present invention, the battery accommodated in the battery housing is charged by the charging unit.

In order to achieve the objects stated above, the present invention is also directed to a cradle apparatus which electrically connects a camera with an external device, the cradle apparatus comprising: a cradle body having a camera mount on which the camera is mounted; a sliding member disposed in the cradle body slidably in a sliding direction substantially orthogonal to a mounting direction of the camera; and a cradle connector disposed on the sliding member to protrude in the sliding direction of the sliding member to emerge and retract toward and away from the camera mount along with the sliding of the sliding member to be engaged with and disengaged from a camera connector of the camera mounted to the camera mount.

According to the present invention, the cradle connector is slid by the sliding member to be connected to the camera connector of the camera mounted to the camera mount of the cradle body.

The cradle connector can comprise communication terminals for two-way communication with the external device and power terminals for supplying power to the camera, and can further comprise audio/visual terminals for receiving audio/visual signals from the camera and outputting the audio/visual signals to the external device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A cradle apparatus for a camera according to the present invention will be described below with reference to the accompanying drawings with respect to preferred modes of implementing the invention.

Figure 1:
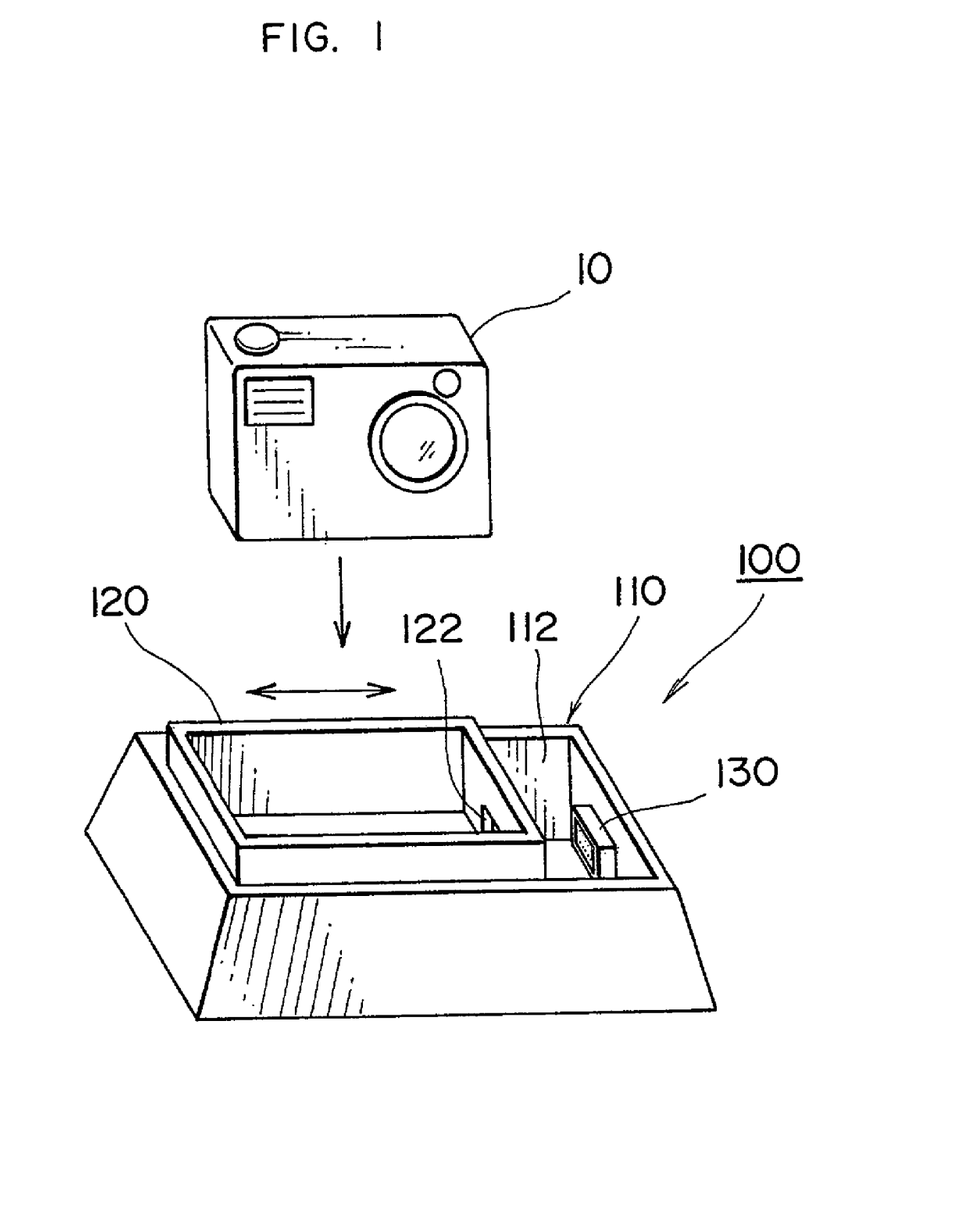
FIG. 1 shows a perspective view of a cradle apparatus for a camera, which is a first preferred embodiment of the invention.

FIG. 1 shows a perspective view of a cradle apparatus for a camera, which is a first preferred embodiment of the invention.

As illustrated therein, a cradle apparatus 100 is mainly configured of a cradle body 110, a sliding member 120 and a cradle connector 130. The cradle body 110 houses the sliding member 120, and comprises a recessed camera mount 112 for slidably guiding the camera in lateral directions in FIG. 1. Alongside this camera mount 112 is provided the cradle connector 130.

The sliding member 120 is a box-shaped case for accommodating and fixing a digital camera 10, and on its side opposite the cradle connector 130 is provided an opening 122 as an inlet/outlet for the cradle connector 130.

Therefore, as shown in FIG. 1, as the digital camera 10 is put into the sliding member 120 from above and the sliding member 120 (with the digital camera 10 in it) is slid in the rightward direction in FIG. 1, a camera connector (not shown) provided on a side of the digital camera 10 is connected to the cradle connector 130.

The digital camera 10, by virtue of its accommodation and holding by the sliding member 120, is positioned relatively to the sliding member 120, and therefore the camera connector is connected to the cradle connector 130 in a satisfactory manner (without being inserted obliquely).

In a state in which the camera connector of the digital camera 10 is connected to the cradle connector 130, even if the digital camera 10 is lifted by itself inadvertently, the digital camera 10 will not come off the cradle apparatus 100, and therefore interruption of data transmission/reception between the digital camera 10 and a PC via the cradle apparatus 100 or the falling of the cradle apparatus 100, which might result from such coming-off, is prevented. Thus, without providing a special locking mechanism between the digital camera 10 and the cradle apparatus 100, the connection between the camera connector and the cradle connector 130 can be easily lock the digital camera 10 onto the cradle apparatus 100.

Furthermore, as the cradle connector 130 is laterally disposed relatively to the cradle body 110 and accordingly its terminals are not exposed upward, the dustiness of the terminals in a state in which the digital camera 10 is disengaged can be kept to the minimum.

Figure 2:
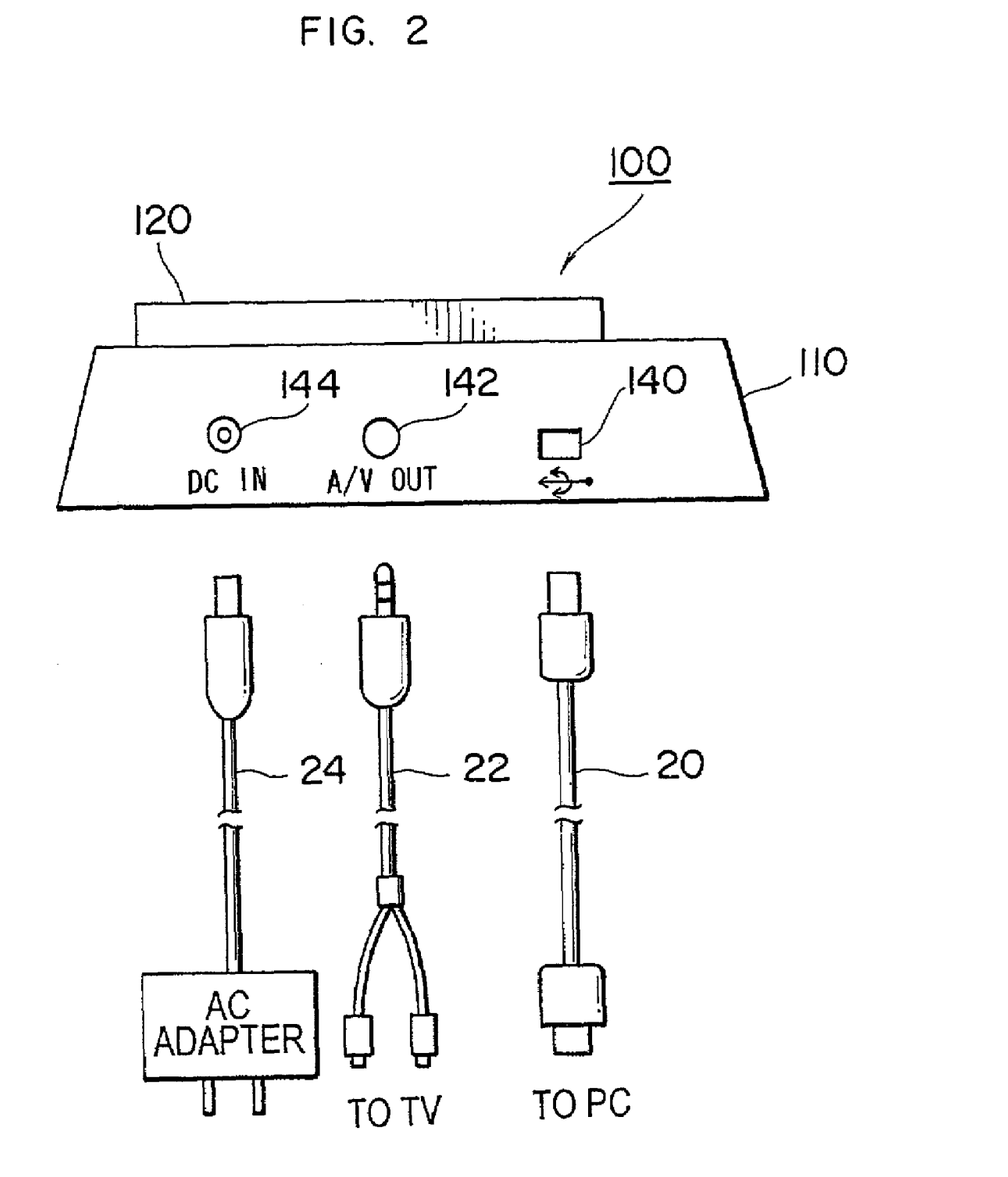
FIG. 2 shows the rear face of the cradle apparatus illustrated in FIG. 1.

FIG. 2 shows the rear face of the cradle apparatus 100 described above. As illustrated therein, on the rear face of the cradle apparatus 100, there are provided a USB jack 140 for connecting with the plug of a USB cable 20, an A/V jack 142 for connecting with the plug of an A/V cable 22, and a DC jack 144 for connecting with the plug of an AC adapter 24.

Figure 3:
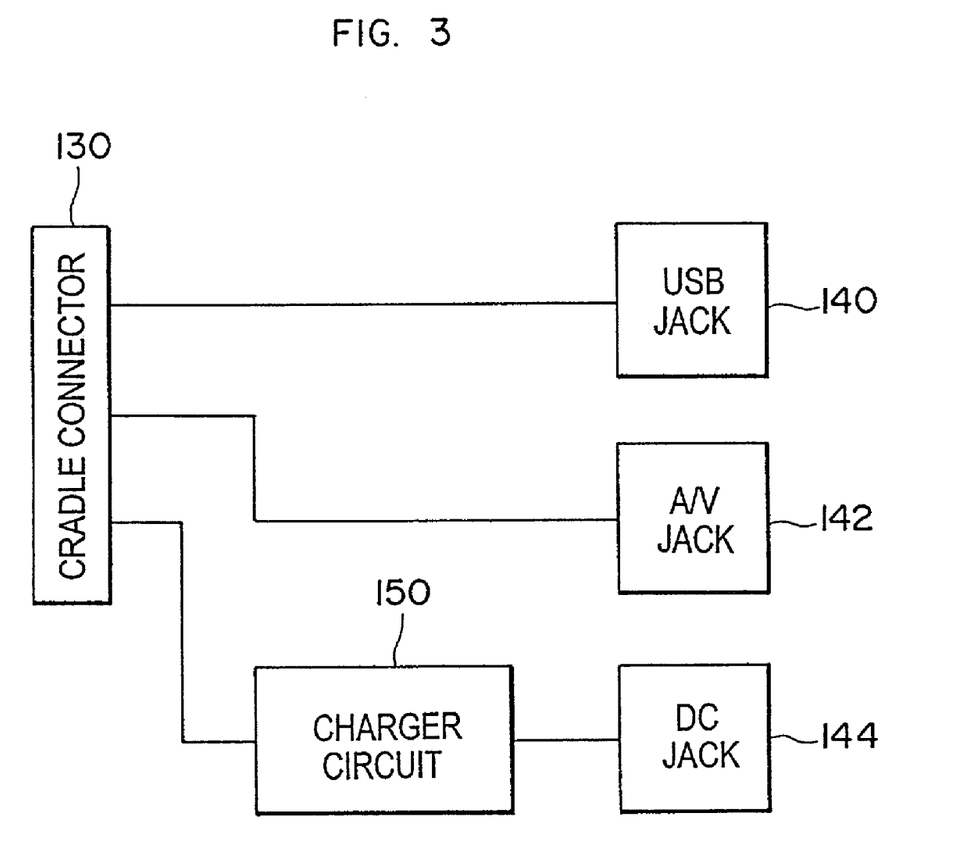
FIG. 3 is a block diagram schematically illustrating the internal circuit of the body of the cradle shown in FIG. 1.

FIG. 3 is a block diagram schematically illustrating the internal circuit of the cradle body 110. As illustrated therein, the USB jack 140 and the A/V jack 142 are directly connected to each other via the matching terminals and wiring in the cradle connector 130, while the DC jack 144 is connected to the matching terminals in the cradle connector 130 via a charger circuit 150.

Figure 4:
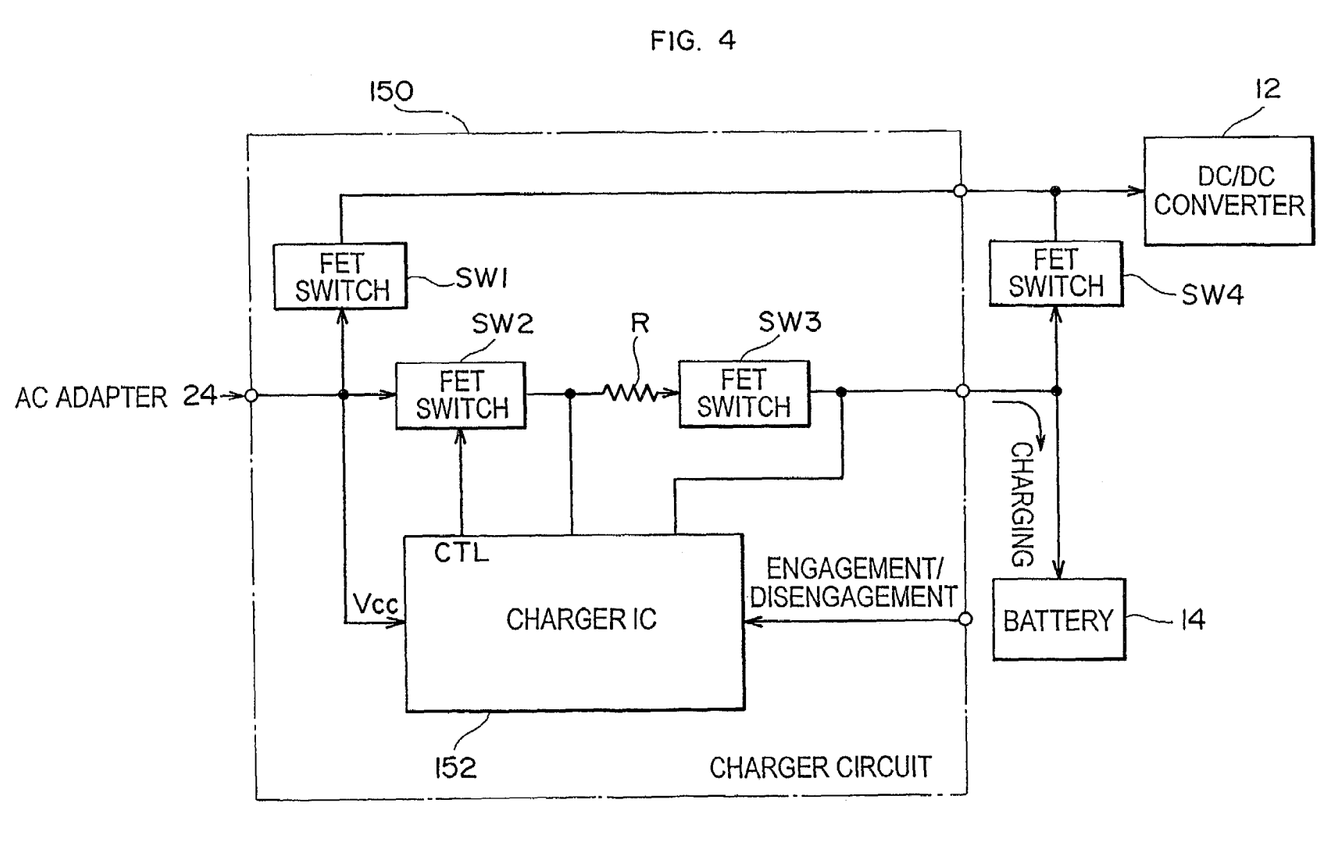
FIG. 4 is a circuit diagram illustrating details of the charger circuit shown in FIG. 3.

FIG. 4 is a circuit diagram illustrating details of the charger circuit 150 shown in FIG. 3 .

This charger circuit 150, as illustrated in FIG. 4, is mainly configured of a field effect transistor switch (FET switch) SW1, an FET switch SW2, an FET switch SW3 and a charger IC 152, and can be connected to a DC/DC converter 12, an FET switch SW4 and a chargeable battery 14 of the digital camera 10 via the cradle connector 130.

The FET switch SW1 in the charger circuit 150 is turned on when power is to be supplied from the AC adapter 24 to the digital camera 10. Thus, in a state in which the AC adapter 24 is connected to the charger circuit 150, when it is detected via terminals (not shown) of the camera connector and the cradle connector 130 that the power switch of the camera is turned on, the FET switch SW1 is turned on. This causes power to be supplied from the AC adapter 24 to the DC/DC converter 12 of the digital camera 10 via the FET switch SW1.

The FET switch SW4 on the digital camera 10 is turned on when power is to be supplied from the battery 14 to the digital camera 10, and supplies power to the DC/DC converter 12. The DC/DC converter 12 generates a plurality of voltages needed for the operation of the different circuits of the digital camera 10, and supplies these voltages to the respectively matching circuits.

The FET switch SW2 is under on/off control by the charger IC 152. Thus, the charger IC 152 turns on the FET switch SW2 when power is supplied from the AC adapter 24, the digital camera 10 is loaded with the battery 14 and the power supply to the camera is off. This causes charging power to be supplied from the AC adapter 24 to the battery 14 via the FET switch SW2, a resistor R and the FET switch SW3, the battery 14 is thereby charged. The FET switch SW3 is turned off when power is to be supplied to the camera via the FET switch SW1 or the FET switch SW4.

The charger IC 152 detects the charging voltage and the charging current of the battery 14 from the voltages before and after the resistor R and, if the fully charged state of the battery 14 is thereby detected, turns off the FET switch SW2 to stop charging of the battery 14.

Figure 5:
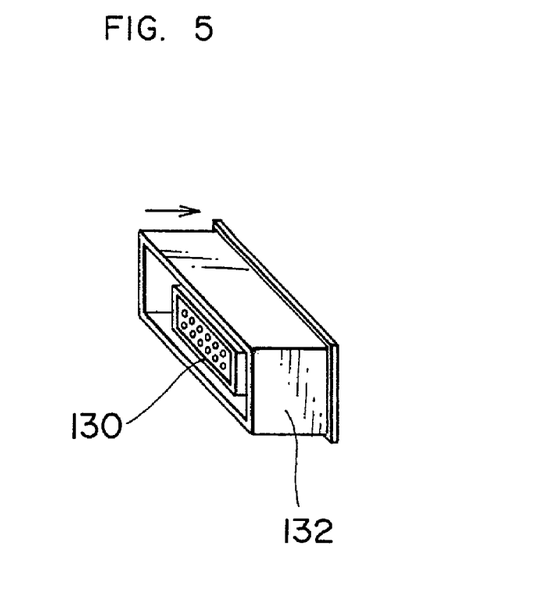
FIG. 5 shows a perspective view of another mode of implementing the invention in which the cradle connector illustrated in FIG. 1 comprises a connector cover.

FIG. 5 shows another mode of implementing the invention in which the cradle connector 130 illustrated in FIG. 1 comprises a connector cover 132. This connector cover 132 is disposed on the cradle body side, slidable between a position in which the cradle connector 130 is covered and another position in which it is exposed, and usually energized by a spring (not shown) to protrude in the position shown in FIG. 5.

Now, when the sliding member 120 housing the digital camera 10 is slid in the direction of connector connection, only the connector cover 132 is pressed down by the periphery of the opening 122 on the side of the sliding member 120. This causes the connector cover 132 to be pressed by the energizing force of the spring in the direction of the arrow in FIG. 5, and the cradle connector 130 is connected to the camera connector of the digital camera 10 via the opening 122 in the side of the sliding member 120.

This connector cover 132 can protect the terminal face of the cradle connector 130 from dust.

Figure 6:
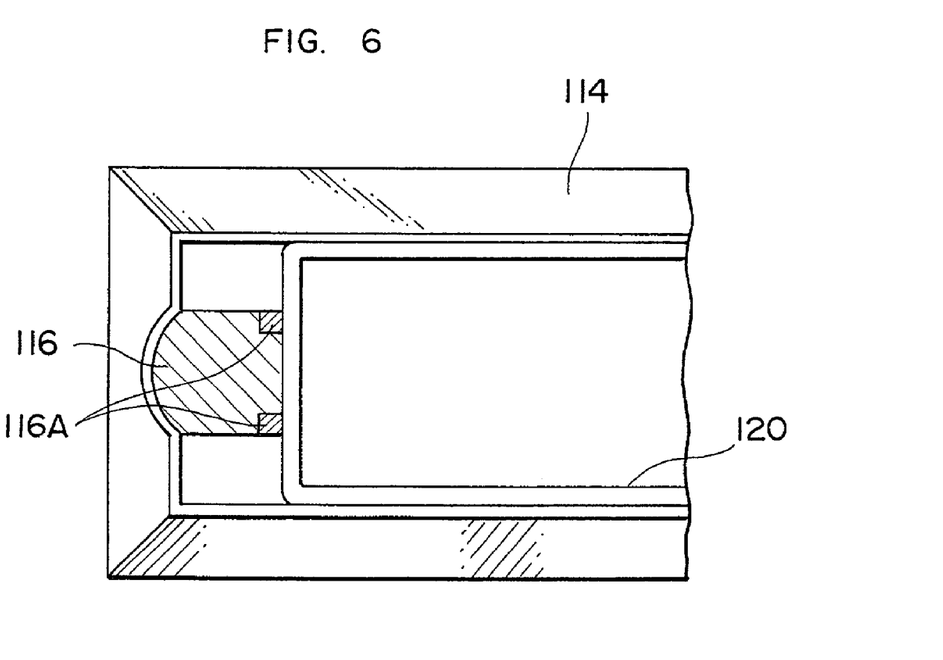
FIG. 6 shows a plan of still another mode of implementing the invention in which the cradle body has a battery housing for charging use.

FIG. 6 shows a plan of a variation of the cradle body 110. A cradle body 114 shown in FIG. 6 comprises a battery housing 116 having charging terminals 116A for charging a spare battery for the digital camera 10. This battery housing 116 utilizes a space that is left between the cradle body 114 and the sliding member 120 when the sliding member 120 has slid to a position in which it comes into contact with the side face on which the cradle connector 130 of the cradle body 114 is provided.

When the spare battery is accommodated in this battery housing 116, the sliding member 120 is prevented from further sliding. This makes it possible to prevent the camera connector and the cradle connector from becoming disengaged from each other unless the spare battery is taken out. Furthermore, the cradle apparatus comprising the battery housing 116 can charge not only the camera's regular battery but also the spare battery accommodated in the battery housing 116. The charging circuit used here has added to the charger circuit 150 shown in FIG. 4, a changeover switch for changing over the charging action between the camera's regular battery and spare battery. When, for instance, the camera's regular battery has run out of charge or been fully charged, the changeover switch can be changed over to the spare battery to supply a charging current to the charging terminals 116A of the battery housing 116.

Figure 7:
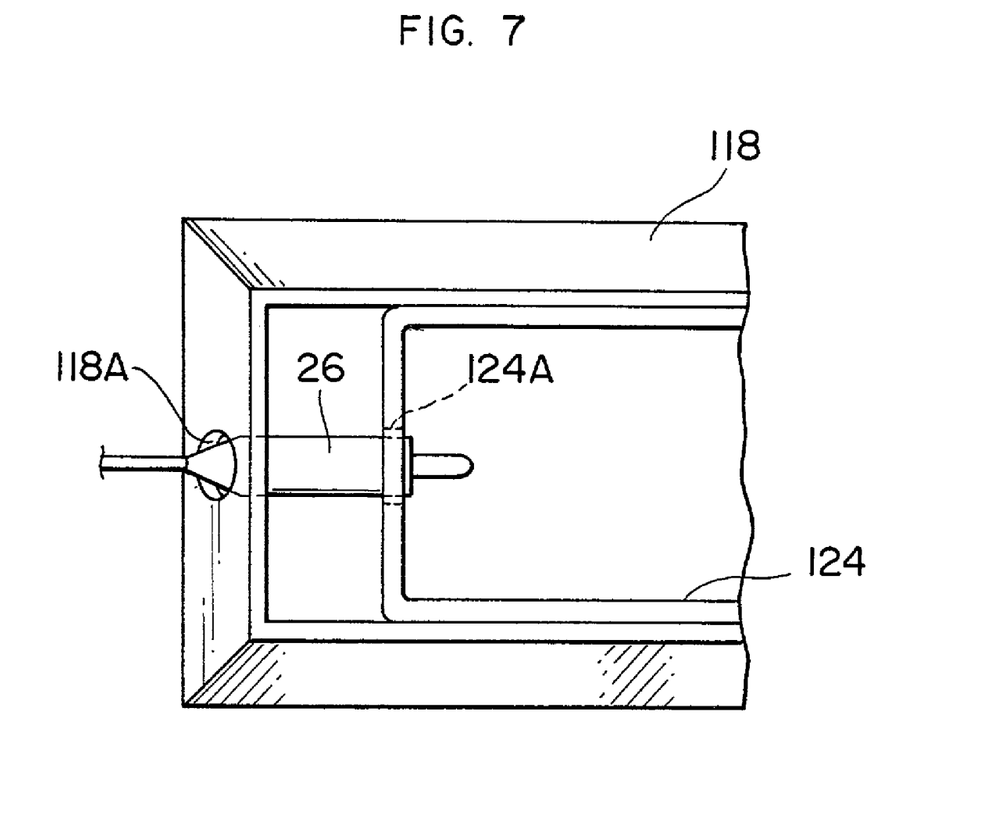
FIG. 7 illustrates an alternative way of utilizing the space left between the cradle body and a sliding member.

FIG. 7 illustrates an alternative way of utilizing the space left between a cradle body 118 and a sliding member 124. Thus, the cradle body 118 and the sliding member 124 comprise openings 118A and 124A through which a plug 26 is to be passed. To add, obviously the digital camera to be mounted to this sliding member 124 should have a jack to which the plug 26 is to be connected.

The plug 26 is connected to the jack of the digital camera via the openings 118A and 124A. When the sliding member 124 is slid to the position shown in FIG. 7, the root portion of the plug 26 is accommodated in the space formed between the cradle body 118 and the sliding member 124. This arrangement serves to protect the root portion of the plug 26 from any force that might otherwise be inadvertently applied to it.

Figure 8:
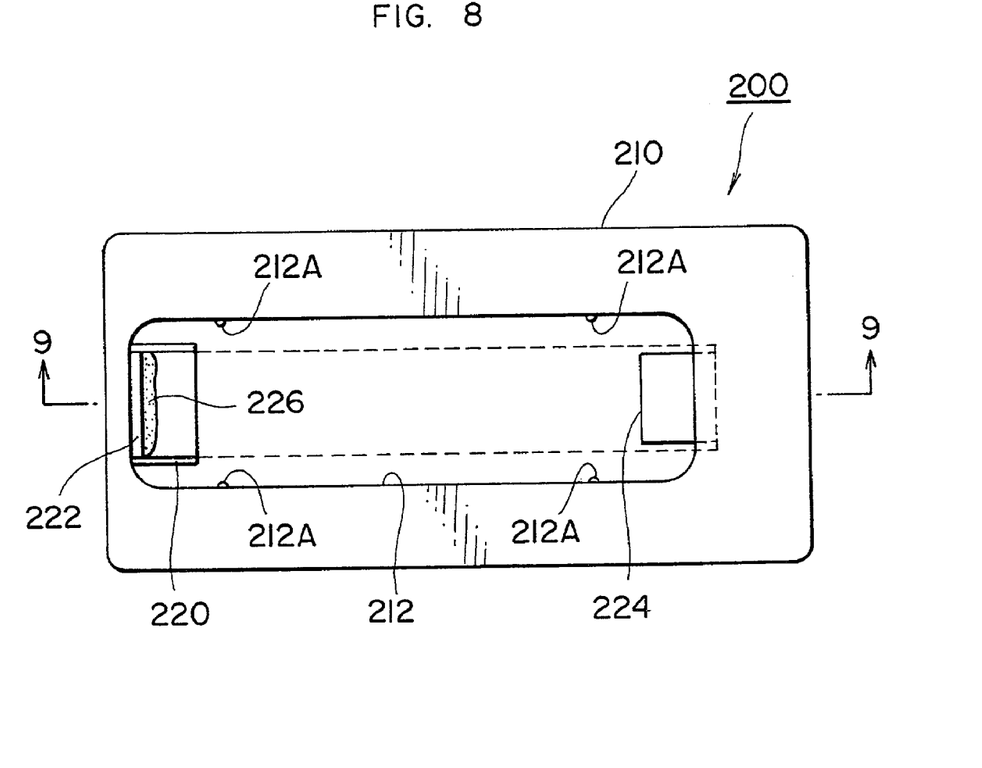
FIG. 8 shows a cradle apparatus for a camera, which is a second preferred embodiment of the invention.
Figure 9:
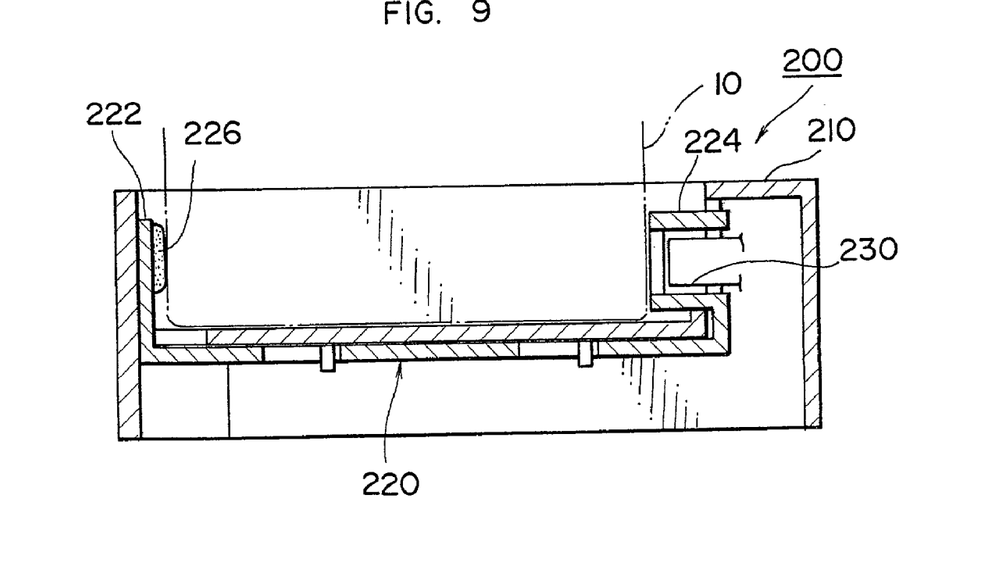
FIG. 9 shows a section along line 9—9 in FIG. 8.

FIG. 8 shows plan of a cradle apparatus for a camera, which is a second preferred embodiment of the invention, and FIG. 9, a section along line 9—9 in FIG. 8.

As these drawings show, this cradle apparatus 200 is mainly configured of a cradle body 210, a sliding member 220 and a cradle connector 230. In the cradle body 210 is formed a recessed camera mount 212, and this camera mount 212 slidably guides the sliding member 220 in lateral directions in FIG. 8 and FIG. 9.

The sliding member 220 has a pair of holders 222 and 224 for holding two sides of the digital camera 10. Inside one holder 222 is disposed a non-slip (rubber) friction member 226, and the other holder 224 is formed in such a shape as covers the cradle connector 230. The sliding member 220, as it is formed of plastic, can be elastically deformed when the digital camera 10 is mounted, so that the pair of holders 222 and 224 can hold the digital camera 10 and at the same time the friction member 226 can secure a required holding force.

When the digital camera 10 is put into the cradle apparatus 200 of the above-described configuration, the digital camera 10 is held in such a manner that its two sides are held by the pair of holders 222 and 224 of the sliding member 220 as stated above, its bottom is in contact with the bottom of the camera mount 212 of the cradle body 210, and its front and rear faces are in contact with four guiding stubs 212A position toward the front and back of the camera mount 212 of the cradle body 210.

When the digital camera 10 accommodated as described above is slid in the rightward direction in FIG. 8 or FIG. 9, the camera connector provided on a side of the digital camera 10 is connected to the cradle connector 230.

Figure 10:
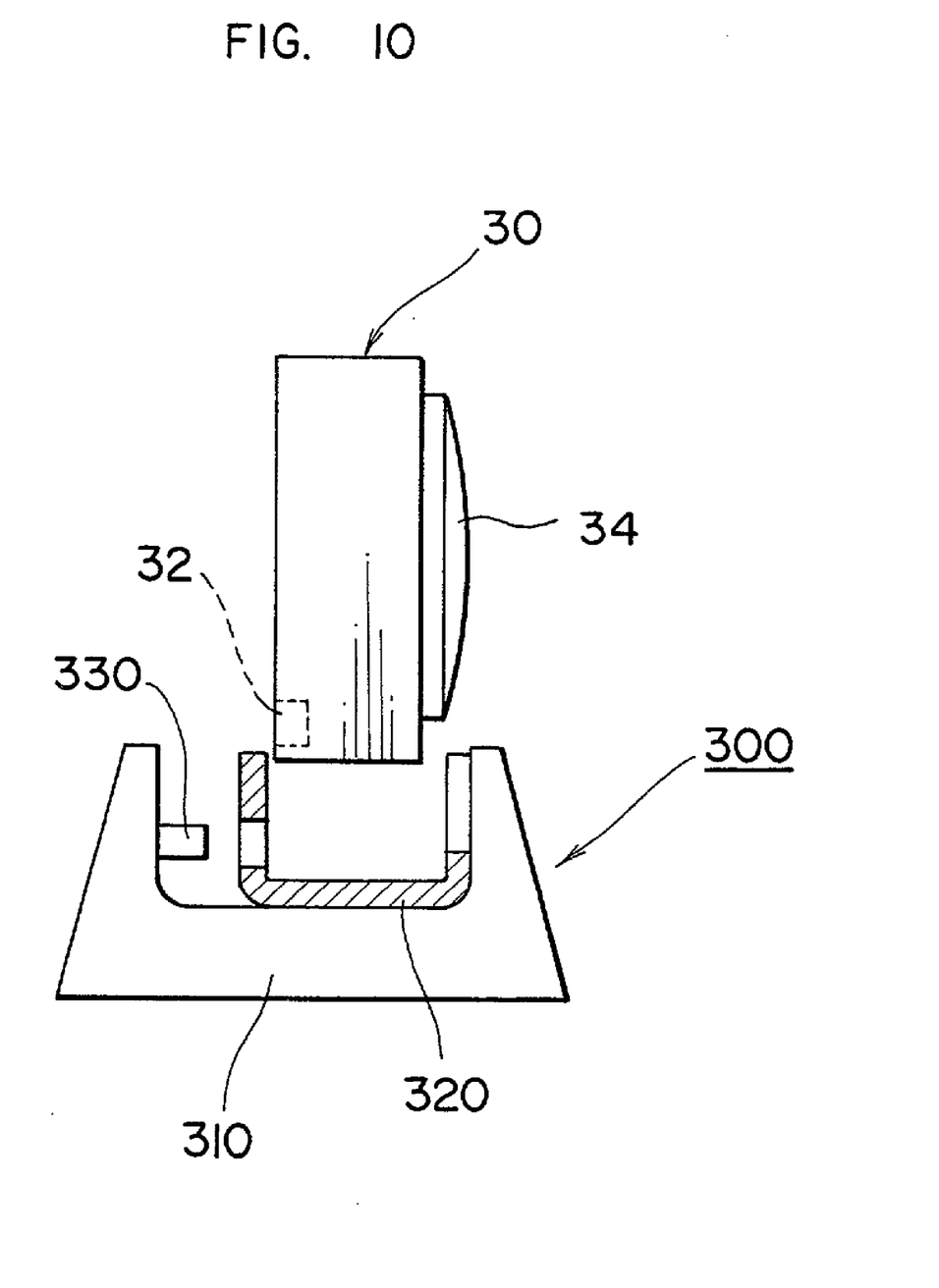
FIG. 10 shows a section of essential parts of a cradle apparatus for a camera, which is a third preferred embodiment of the invention.

FIG. 10 shows a section of essential parts of a cradle apparatus for a camera, which is a third preferred embodiment of the invention.

As illustrated in FIG. 10, this cradle apparatus 300 is mainly configured of a cradle body 310, a sliding member 320 and a cradle connector 330. On the other hand, a digital camera 30 comprises a camera connector 32 on the back.

Therefore, when a digital camera 30, after it is accommodated in the sliding member 320, is slid backward (leftward in FIG. 10), the camera connector 32 is connected to the cradle connector 330. Whereas the digital camera 30 has a large lens barrier 34 on the front face, the lens barrier 34 can be opened and closed smoothly in a state in which the digital camera 30 is mounted on the cradle apparatus 300 because the cradle apparatus 300 embodying the invention in this mode has, in a state in which the camera connector 310 and the cradle connector 330 are connected to each other, a space formed in front of the digital camera 30 (space between the cradle body 310 and the sliding member 320).

Figure 11:
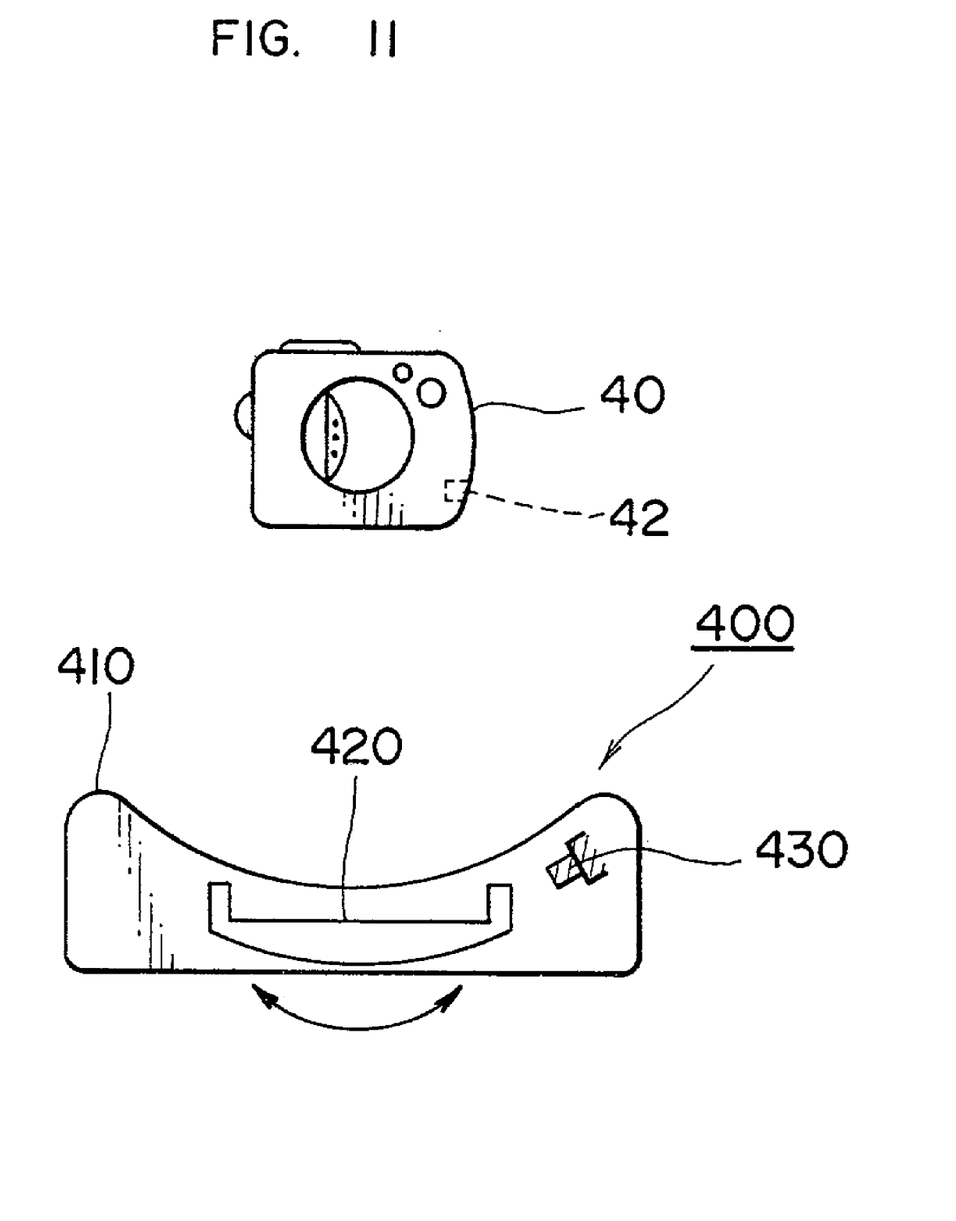
FIG. 11 illustrates a cradle apparatus for a camera, which is a fourth preferred embodiment of the invention.

FIG. 11 illustrates a cradle apparatus for a camera, which is a fourth preferred embodiment of the invention.

As shown in FIG. 11, this cradle apparatus 400 is mainly configured of a cradle body 410, a sliding member 420 and a cradle connector 430. The sliding member 420 can swing relatively to the cradle body 410 in lateral directions in FIG. 11.

Therefore, when a digital camera 40, after it is accommodated in the sliding member 420, is swung toward the right side in FIG. 11, a camera connector 42 provided on a side of the digital camera 40 is connected to the cradle connector 430. Although in this embodiment the digital camera 40 is inclined in a state in which the connectors are connected to each other, it is preferable to configure the cradle apparatus so as to keep the digital camera 40 horizontal in the state in which the connectors are connected.

Figure 12:
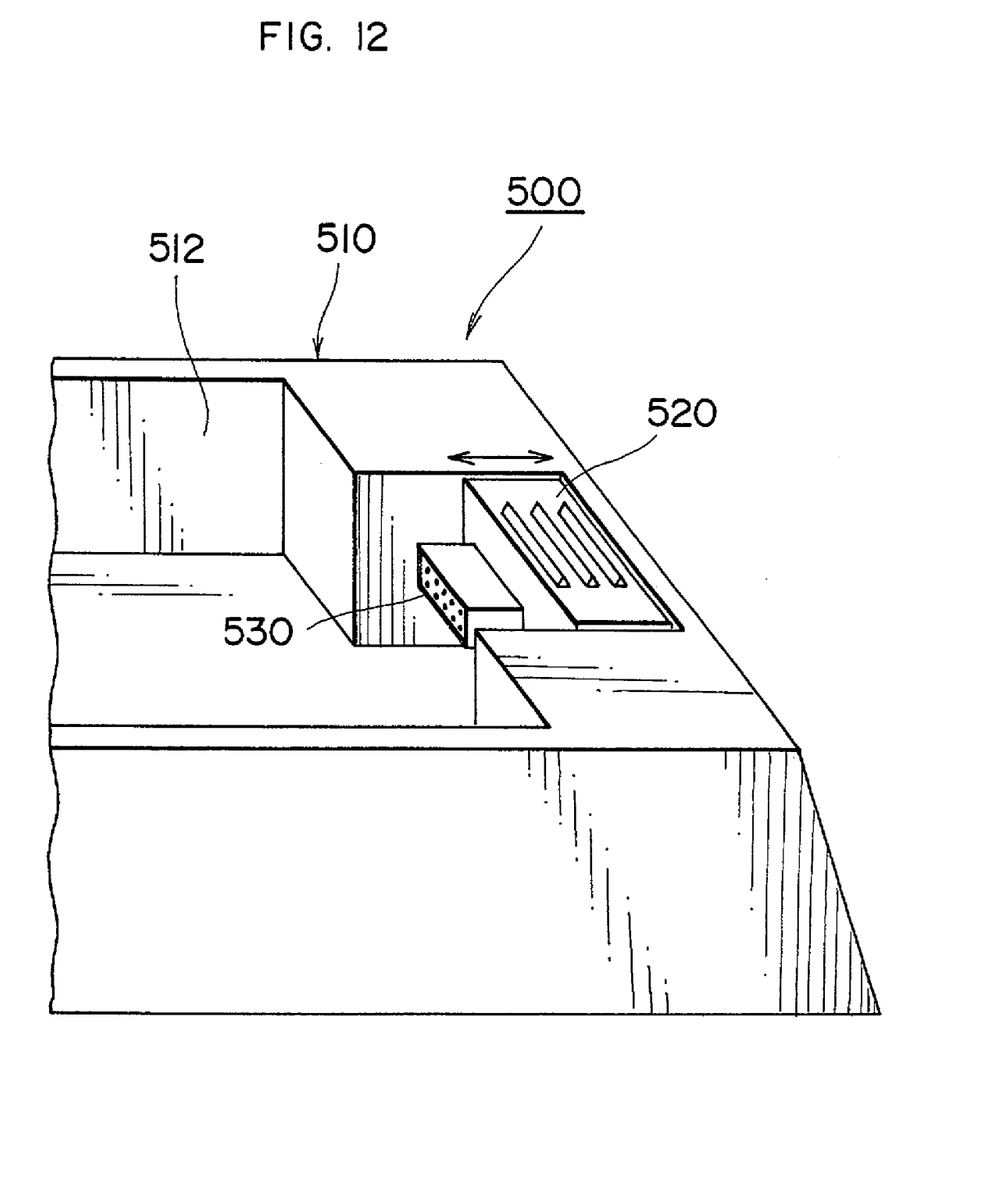
FIG. 12 illustrates a cradle apparatus for a camera, which is a fifth preferred embodiment of the invention.

FIG. 12 illustrates a cradle apparatus for a camera, which is a fifth preferred embodiment of the invention.

As shown in FIG. 12, this cradle apparatus 500 is mainly configured of a cradle body 510, a sliding member 520 and a cradle connector 530.

The cradle body 510 has a camera mount 512 to which a digital camera is to be mounted, and the sliding member 520 is disposed to be slidable relatively to the cradle body 510 in lateral directions in FIG. 12. The cradle connector 530 is disposed on a side of the sliding member 520.

Therefore, when the sliding member 520 is slid toward the left side in FIG. 12 after the digital camera is mounted to the camera mount 512, the cradle connector 530 protrudes toward the camera mount 512 (the camera connector of the digital camera) along with the sliding of the sliding member 520, and is connected to the camera connector.

As hitherto described, according to the present invention, the camera after being mounted to the mount is slid relatively to the cradle connector in a direction substantially orthogonal to the mounting direction of the camera to connect the camera connector and the cradle connector to each other, with the result that the connectors can be connected with the camera held in a prescribed posture, so that the connectors can be prevented from being inserted obliquely and can be engaged and disengaged with no trouble. Furthermore, in a state in which the connectors are connected, the camera can be easily locked in the direction of mounting and taking out the camera, and the connectors cannot be disengaged even if the camera is lifted by itself. In addition, as the cradle connector is laterally positioned relatively to the cradle body, its terminals are not exposed upward, and accordingly the dustiness of the terminals can be kept to the minimum. In addition, as the cradle connector is covered by a connector cover which moves back and forth in synchronization with the sliding of the sliding member, the terminals of the cradle connector can be protected from dust.

Further according to the invention, the space formed between the sliding member and the cradle body when this sliding member is slid to connect the camera connector to the cradle connector is utilized as the battery housing, and a charger provided within the cradle body can charge not only the camera's regular battery but also the spare battery accommodated in the battery housing. Moreover, when a battery is accommodated in the battery housing, the accommodated battery can serve as a stopper to forbid further sliding of the sliding member, and thereby more securely lock the camera to the cradle apparatus.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A cradle apparatus which electrically connects a camera with an external device, the cradle apparatus comprising:
    a cradle body having a camera mount on which the camera is mounted;
    a sliding member which holds the camera, the sliding member being disposed in the camera mount of the cradle body slidably in a sliding direction substantially orthogonal to a mounting direction of the camera; and
    a cradle connector disposed in the cradle body to protrude in the sliding direction of the sliding member, the cradle connector being engaged with and disengaged from a camera connector provided on a face of the camera substantially orthogonal to the sliding direction of the sliding member when the sliding member holding the camera slides together with the camera within the cradle body.

2. The cradle apparatus as set forth in claim 1, wherein the sliding member comprises a substantially box-shaped slider which holds the camera on its front, back, right and left faces.

3. The cradle apparatus as set forth in claim 1, wherein:
    the sliding member comprises a pair of holders having holding faces that are substantially orthogonal to the sliding direction of the sliding member, the pair of holders holding the camera on its right and left faces; and
    the camera mount holds front and back faces of the camera.

4. The cradle apparatus as set forth in claim 3, wherein the sliding member comprises an elastic member which is elastically deformed when the camera is mounted to hold the camera on its right and left faces.

5. The cradle apparatus as set forth in claim 3, wherein the sliding member is elastic and can be elastically deformed when the camera is mounted to hold the camera on its right and left faces.

6. The cradle apparatus as set forth in claim 1, wherein:
    the sliding member comprises a pair of holders having holding faces that are substantially orthogonal to the sliding direction of the sliding member, the pair of holders holding the camera on its front and back faces; and
    the camera mount holds right and left faces of the camera.

7. The cradle apparatus as set forth in claim 6, wherein the sliding member comprises an elastic member which is elastically deformed when the camera is mounted to hold the camera on its front and back faces.

8. The cradle apparatus as set forth in claim 6, wherein the sliding member is elastic and is elastically deformed when the camera is mounted to hold the camera on its front and back faces.

9. The cradle apparatus as set forth in claim 1, wherein the sliding member comprises a non-slip friction member disposed inside thereof.

10. The cradle apparatus as set forth in claim 1, further comprising a connector cover disposed on the cradle body movably back and forth between a position where the connector cover covers the cradle connector and a position where the connector cover exposes the cradle connector, the connector cover moving back and forth in synchronization with the sliding of the sliding member.

11. The cradle apparatus as set forth in claim 1, wherein the sliding member comprises a connector cover which covers the cradle connector when the sliding member has slid to a position enabling the camera to be engaged and disengaged, the connector cover being unitedly formed on the sliding member.

12. The cradle apparatus as set forth in claim 1, further comprising a charging unit which charges a battery in the camera via the cradle connector.

13. The cradle apparatus as set forth in claim 12, further comprising a battery housing which, when the sliding member is slid so as to connect the camera connector to the cradle connector, is demarcated by the sliding member and the camera mount of the cradle body.

14. The cradle apparatus as set forth in claim 1, further comprising a battery housing which, when the sliding member is slid so as to connect the camera connector to the cradle connector, is demarcated by the sliding member and the camera mount of the cradle body.

15. The cradle apparatus as set forth in claim 1, wherein the cradle connector comprises communication terminals for two-way communication with the external device and power terminals for supplying power to the camera.

16. The cradle apparatus as set forth in claim 15, wherein the cradle connector further comprises audio/visual terminals for receiving audio/visual signals from the camera and outputting the audio/visual signals to the external device.

17. The cradle apparatus according to claim 1, wherein the camera mount comprises a recess in the cradle body.

18. The cradle apparatus according to claim 1, wherein the camera mount comprises a recess extending throughout a bottom face of the cradle body.

19. The cradle apparatus according to claim 1, wherein the cradle connector is disposed on a side face of the cradle body.

20. A cradle apparatus according to claim 1, wherein the camera is inserted into the camera mount.

21. The cradle apparatus according to claim 1, wherein said camera comprises a digital still camera.

22. The cradle apparatus according to claim 1, wherein said camera is directly mounted onto the camera mount.

23. A cradle apparatus which electrically connects a camera with an external device, the cradle apparatus comprising:
   a cradle body having a camera mount on which the camera is mounted;
   a sliding member disposed in the cradle body slidably in a sliding direction substantially orthogonal to a mounting direction of the camera; and
   a cradle connector disposed on the sliding member to protrude in the sliding direction of the sliding member to emerge and retract toward and away from the camera mount along with the sliding of the sliding member to be engaged with and disengaged from a camera connector of the camera mounted to the camera mount.

24. The cradle apparatus as set forth in claim 23, wherein the cradle connector comprises communication terminals for two-way communication with the external device and power terminals for supplying power to the camera.

25. The cradle apparatus as set forth in claim 24, wherein the cradle connector further comprises audio/visual terminals for receiving audio/visual signals from the camera and outputting the audio/visual signals to the external device.

26. A cradle apparatus which electrically connects a camera with an external device, the cradle apparatus comprising:
   a cradle body having a camera mount on which the camera is mounted;
   a sliding member which holds the camera, the sliding member being disposed in the camera mount of the cradle body slidably in a sliding direction substantially orthogonal to a mounting direction of the camera; and
   a cradle connector disposed in the cradle body to protrude in the sliding direction of the sliding member, the cradle connector being engaged with and disengaged from a camera connector provided on the camera substantially orthogonal to the sliding direction of the sliding member when the sliding member holding the camera slides together with the camera within the cradle body.

27. The cradle apparatus according to claim 26, wherein the cradle connector is disposed on a side face of the cradle body.

* * * * *